Feb. 23, 1937. L. P. SHIELD 2,071,771
SYSTEM AND APPARATUS FOR DISTRIBUTING OR COLLECTING ARTICLES
Filed June 12, 1933
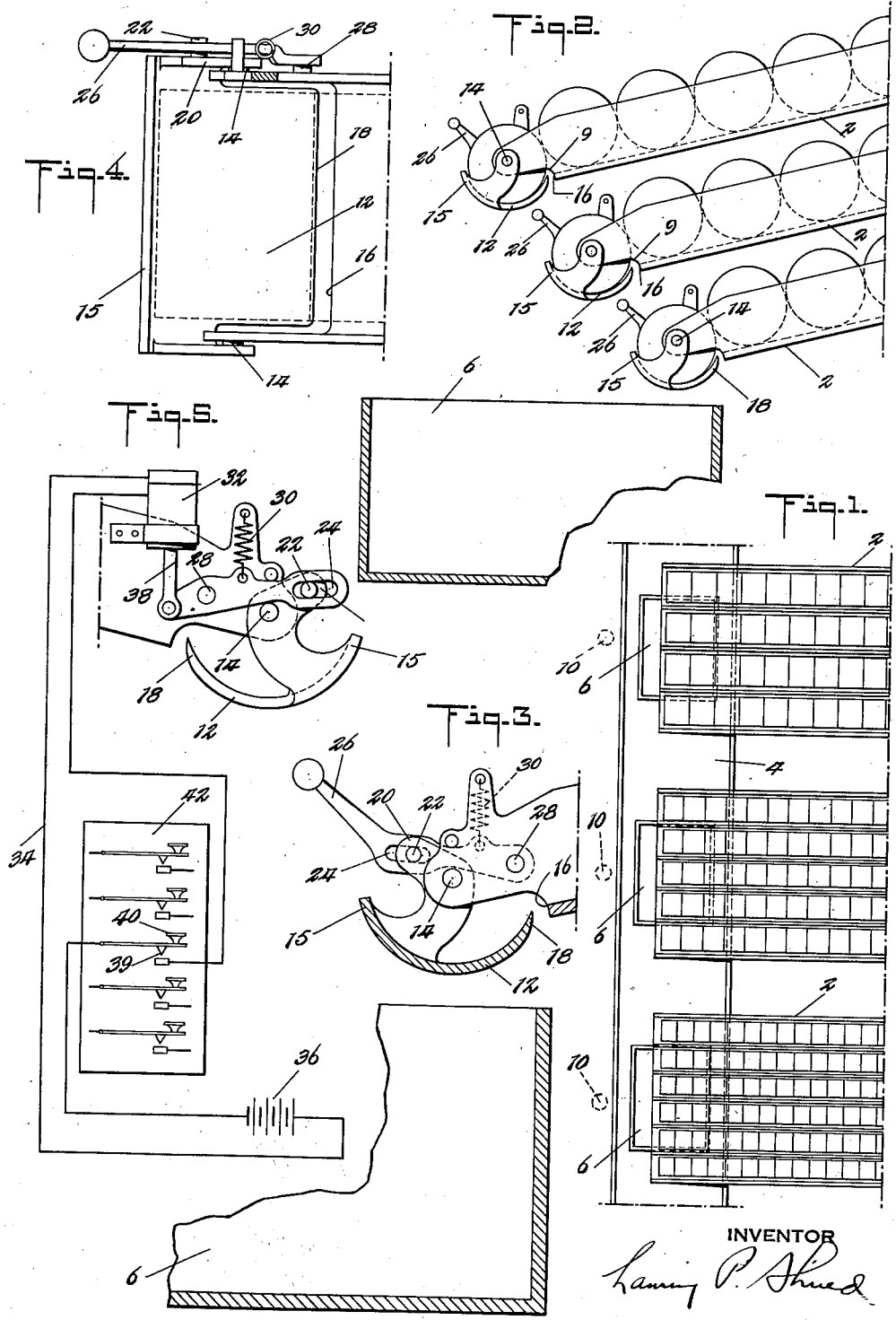
INVENTOR
Laning P. Shield Patented Feb. 23, 1937

2,071,771

UNITED STATES PATENT OFFICE 2,071,771

SYSTEM AND APPARATUS FOR DISTRIBUTING OR COLLECTING ARTICLES

Lansing P. Shield, Hackensack, N. J.

Application June 12, 1933, Serial No. 675,383

2 Claims. (Cl. 186—3)

My invention relates to systems and apparatus or equipment for filling orders or assembling various groups of objects quickly and economically and may be employed to advantage in grocery and drug establishments, department stores, factories, warehouses, manufacturing plants, and similar places where it is desired to assemble articles of the same kind or of various kinds in groups.

In my copending application Serial No. 673,839 filed June 1, 1933 I have described a distributing system adapted for filling orders or for assembling groups of various articles in a rapid and efficient manner. The system described therein is particularly adapted for use in commercial, governmental or other establishments wherein it is desirable to assemble a large number of different groups of articles many or all of which may comprise a relatively small portion of the whole number or variety of articles comprised in the stock, parts or assemblage from which the groups are selected.

My present invention is a modification of and in many respects an improvement upon the methods and equipment set forth in said copending application. As hereinafter described my invention embodies mechanism which may include mechanical or electrical means for performing operations which as described in my copending application are performed manually. The means hereinafter described and the methods of operation thereof enable an operator selectively to effect the transfer of articles from any one or more delivery means to receptacles for receiving the same without handling the articles themselves. My invention therefore permits of rapid operation with a minimum amount of time, work and effort on the part of the operator.

In accordance with the present invention the articles to be delivered are supplied to an operator's station through any suitable delivery means or channels such as those shown and described in my copending application. Receptacles or other means for receiving the articles are passed along a counter adjacent to, and preferably beneath, the delivery means and may be moved intermittently or continuously from one operator's station to another. I also provide novel construction for the delivery means in which the delivery ends thereof are so formed and arranged that discharge of an article from one of said means will not interfere with the discharge or delivery of other articles simultaneously or in rapid succession from adjacent delivery means.

The present invention also includes mechanism actuated by levers, keys, handles or other suitable devices under the control of the operators and selectively operable to discharge articles from the delivery means. Each operator may therefore effect the delivery of selected articles or a portion of a selected group of articles from the delivery means to receptacles or other article receiving means by simple movements which can be performed easily and rapidly. The operator therefore need not leave her station or move about from place to place to gather the articles needed for filling the orders.

The features and objects of the present invention are similar to those set forth in my copending application, and It is a particular object of the present invention to provide means under the control of an operator for selectively discharging articles from delivery means.

Another object of my invention is to provide mechanism whereby the operator may cause selected articles to be transferred from the delivery means to a receptacle in rapid succession.

A further object of my invention is to provide electrical mechanism, selectively operable, to transfer an article from the delivery means to a receptacle when the receptacle is in position adjacent the delivery means.

Another object of my invention is to provide an improved form and arrangement of delivery means and counter along which receptacles for receiving articles from the delivery means are moved.

Other objects of my invention are to deliver articles for filling an order or a portion thereof to an operator in a convenient and readily accessible manner, to provide simple and effective means for assembling diverse groups of selected articles and to reduce the excessive cost and time spent in filling orders or in assembling selected articles from a large group comprising the stock or other assemblage from which the articles selected are to be drawn.

These and other objects and features of my invention will appear in the following description thereof in which reference is made to the accompanying figures of the drawing.

In the drawing:

Fig. 1 is a diagrammatic plan view of a portion of one form of equipment embodying my invention;

Fig. 2 is a side elevation of the end of the delivery means shown in Fig. 1;

Fig. 3 is an enlarged view, partly in section, showing one form of delivery mechanism;

Fig. 4 is a plan view of the form of delivery mechanism shown in Fig. 3; and

Fig. 5 is a diagrammatic view of an alternative form of my invention embodying electrical means for actuating the delivery mechanism.

In the form of my invention illustrated in Figs. 1 and 2, I have shown delivery means such as chutes, channels, conveyors or the like, indicated by the numeral 2. These delivery means are preferably located adjacent to and may extend outwardly over a support or counter 4 along which recetpacles or other article receiving means 6 are passed. Several tiers of delivery means or channels arranged one above the other may be provided as illustrated in Fig. 2. The tiers are preferably constructed with the delivery ends thereof stepped outwardly so that the delivery end of each tier extends beyond that of the tier immediately below. This construction enables articles to be delivered from the upper delivery means or channels without interfering with the delivery of other articles from the delivery means or channels of any of the lower tiers. If desired, the delivery end 9 of each channel may be formed to have articles delivered downwardly therefrom directly into the receptacles movable along the counter below. The front end of each channel may be constructed to enable the operator to see the articles therein so that any improper operation or delivery may be observed and corrected without delay.

The delivery channels are arranged preferably in groups each under the control of a separate operator. The operators are located at delivery stations 10 accessible to a number of delivery channels. The operators may be stationed on the opposite side of the counter or support from the delivery means so they can observe simultaneously the operation of the delivery means and the movement and position of the receptacles.

In order to effect the delivery of articles from the delivery means and avoid handling of the articles each delivery channel is provided with mechanism operable to cause an article to be segregated from others contained in the channel and be discharged therefrom. As illustrated in Fig. 2, the delivery mechanism is secured to the delivery end of each channel and includes a releasing member 12 of any suitable shape for receiving an article to be delivered. The member 12 is mounted for rotation on pivots 14 extending through the sides of the channels. The lower portion of the channel is cut away at 16 so that articles passing through the channel by gravity or otherwise successively come to rest in engagement with the upwardly extending forward edge 15 of the member 12. The edge 15 thus acts as an abutment to prevent accidental discharge of articles from the channel. The size and shape of the member 12 are such as to accommodate each article to be delivered. The rearward edge 18 of the member 12 when in the position shown in full lines in Figs. 2 and 3 is flush with or slightly below the bottom of the delivery channel. Upon rotation of said member the rearward edge 18 thereof moves upwardly separating the article positioned on said member from the other articles in the channel and holding them in place so that they cannot move forward to interfere with the delivery of the article located in the delivery mechanism. At the same time rotation of the member 12 about its pivots causes the article carried thereby to be discharged by gravity and to pass downwardly into a receptacle or other receiving means on the counter below the same.

Operation of the delivery mechanism to discharge articles from the delivery means may be effected by movement of a crank 20 secured to the member 12 and provided with a pin 22 engaging a slot 24 in an operating lever 26. The lever 26 is pivoted at 28 on one side of the channel and normally is held in its raised position by a spring 30. Upon the downward movement of the operating lever 26, the releasing member 12 is rotated about the pivots 14. The forward edge 15 moving downward causes the discharge of the article positioned on the member 12. Simultaneously the rearward edge 18 of the member 12 is moved upward to prevent forward movement of the articles remaining in the channel 2. The pivot 28 of the lever 26 is preferably spaced from the pivots 14 of the member 12 so that the member 12 is rotated through a relatively large arc upon comparatively limited movement of the lever 26. Upon release of the operating lever, the spring 30 raises the same to its full line position, lowering the rearward edge 18 so that other articles in the channel may move forward until the foremost article is brought to rest in the member 12 and against the forward edge 15 thereof ready to be discharged upon the next operation of the lever 26.

In employing the apparatus described above receptacles for receiving the articles called for by the various orders are placed on the counter and each receptacle is provided with a record or copy of an order to be filled. The copy of the order may be attached to and move with the receptacle or means may be employed for separate movement of the order along the counter adjacent to the receptacle and in timed relation to the simultaneous movement of the receptacle. The receptacles are moved along the counter one after another and each receptacle is brought successively into position adjacent each of the stations in turn. The receptacles may be moved along by any suitable means such as a belt, conveyor or the like, or if desired they may be moved manually from one station to another. Preferably the receptacles are moved step by step from one station to another and if the operator at a particular station controls a relatively large number of delivery channels the receptacles may be moved step by step from one portion of a station to another portion of the same station. While one form of means for moving the receptacles along the counter is described in my copending application referred to above, any other suitable means may be employed for this purpose.

When a receptacle is brought into position adjacent the delivery channels at one station, the operator glances at the order carried by, or movable along the counter with, the receptacle and observes which, if any, articles recited in the order are contained in the delivery means under her control. The operator thereupon actuates those operating levers required to selectively deliver the articles under her control which are indicated in the order. This she does by depressing the lever 26 associated with the delivery mechanism of the delivery channels containing the desired articles. Upon delivery of the articles from the delivery means into the receptacle, the receptacle is moved to another portion of the same station or to the next delivery station. When the operator has completed the portion of the order calling for articles under her control and the receptacle has moved on, the operator at the next succeeding station proceeds in like manner to fill her portion of the order. Meanwhile another receptacle and order are moved into place adjacent the delivery means at the first operator's station. The articles under the first operator's control which are called for by her portion of the new order are then discharged into the succeeding receptacle. Thus each operator fills only a portion of each order and in some instances one or more of the operators may not deliver any articles into a particular receptacle, depending upon the nature of the order associated therewith. However, as it passes along the row of delivery means and through each of the delivery stations in turn, each receptacle has delivered into it all of the articles recited in the associated order, so that when each receptacle reaches the end of the row of delivery means the order associated therewith has been filled. In this way the orders are completed and delivered one after another in rapid succession at the end of the counter so that much time otherwise consumed in filling orders of this character is saved. The cost of handling a large volume of orders is therefore materially reduced and the orders may be rapidly and economically delivered to the customer.

The delivery mechanism described above is of a mechanical nature but it will be apparent that various other forms and types of delivery mechanism may be employed for discharging articles from the delivery means. In Fig. 5 of the drawing I have illustrated diagrammatically electrical means for actuating the delivery mechanism. For purposes of illustration the releasing member 12 and the operating lever 26 of the form of delivery mechanism shown in Figs. 3 and 4 are employed. However, in this instance, movement of the operating lever is effected by means of a solenoid 32 connected by the conductor 34 to a suitable source of current 36. Actuation of the solenoid causes an armature 38 to be drawn upward moving the lever 26 about its pivot 28 thus causing an article to be discharged from the delivery channel. The circuit including the solenoid 32 is preferably completed by closing a switch 39 operated by means of a key 40 mounted on a keyboard 42. The keyboard may contain one key for each article in the delivery means under the control of a single operator. However, various combinations of keys with appropriate linking mechanism or circuits may be used for controlling the operation of the solenoid 32 if desired in which case each article may be given a code number and keys indicating the code numbers of the various articles may be selectively operated to discharge articles from the delivery channels.

Operation of the delivery mechanism in the arrangement illustrated is effected by depressing the key 40 associated with the delivery mechanism in the channel from which an article desired is to be discharged. While only one circuit is shown in Fig. 5, it will be apparent that each delivery mechanism is provided with a similar circuit controlled by a corresponding key on the keyboard 42. In this way the operator may cause any one or more articles to be discharged from the delivery channels by selectively operating those keys corresponding to the articles which it is desired to have delivered into the receptacle for receiving same. A keyboard is located at each delivery station and each operator depresses the keys corresponding to the articles to be delivered when a receptacle is in position for delivery of articles from the channels at her station. In using electrical actuating means for the delivery mechanism, the location of the stations and the movement of the receptacles may be the same as described above in connection with the form of mechanism illustrated in Figs. 1 to 4.

While I have described my invention as applicable to the filling of grocery orders and the like it will be apparent that my invention may be employed in connection with any system wherein it is desired to deliver or assemble diverse or similar groups of selected articles in rapid succession.

The form and construction of the apparatus employed in carrying out my invention may be varied considerably and therefore it should be understood that the foregoing description is intended to illustrate and not to limit the scope of my invention.

I claim:

1. An apparatus for use in the simultaneous filling of a plurality of receptacles with different combinations of articles, comprising a support for a plurality of receptacles, a plurality of inclined, gravity-operated storage and delivery chutes, said chutes being arranged in groups, the chutes in each group having their delivery ends above and alongside said support in overhanging, offset relationship, and facing and accessible to an operator placed alongside said receptacle support and on the opposite side thereof from the said chutes, and means, controlled by the several operators, for selectively and simultaneously discharging articles from the several chutes into the various receptacles positioned on said support, whereby a plurality of different combinations of articles may be simultaneously assembled in different receptacles on said support.

2. An apparatus for use in the simultaneous filling of a plurality of receptacles with different combinations of articles, comprising a support for a plurality of receptacles, a plurality of inclined, gravity-operated storage and delivery chutes, said chutes being arranged in groups, the chutes in each group having their delivery ends above and alongside said support in overhanging, offset relationship, and facing and accessible to an operator placed alongside said receptacle support and on the opposite side thereof from the said chutes, and means at the discharge end of each chute, and controlled by the operator, for discharging a single article only from that chute upon each actuation of said means by the operator, whereby a plurality of different combinations of articles may be simultaneously assembled in different receptacles on said support.

LANSING P. SHIELD.